United States Patent [19]
Snell et al.

[11] Patent Number: 6,146,086
[45] Date of Patent: Nov. 14, 2000

[54] MAGNETIC FANNING ACCUMULATOR

[75] Inventors: Shannon D. Snell; Scott C. Reisenauer; Darin D. Baumberger; Rich E. Block, all of Watertown, S. Dak.

[73] Assignee: Midcom, Incorporated, Watertown, S. Dak.

[21] Appl. No.: 09/143,727

[22] Filed: Aug. 31, 1998

[51] Int. Cl.[7] .................................................. B65G 59/06
[52] U.S. Cl. .................................... 414/797.9; 414/797.1; 414/901; 198/465.1; 198/619; 271/146; 271/901
[58] Field of Search ............................. 414/797.9, 797.1, 414/797.4, 797.5, 795.5, 901; 221/75; 198/465.1, 619; 271/146, 901; 34/248

[56] References Cited

U.S. PATENT DOCUMENTS

| | | | |
|---|---|---|---|
| 3,307,716 | 3/1967 | Ross | 271/901 |
| 3,602,378 | 8/1971 | Thompson | 414/797.9 |
| 3,998,448 | 12/1976 | Gray et al. | 271/12 |
| 4,034,846 | 7/1977 | Burgis et al. | 198/422 |
| 4,098,393 | 7/1978 | Wykes et al. | 198/458 |
| 4,166,526 | 9/1979 | Wykes et al. | 198/458 |
| 4,815,916 | 3/1989 | Beck | 414/797.1 |
| 4,946,341 | 8/1990 | Parsley et al. | 271/901 |
| 5,370,495 | 12/1994 | Montalvo et al. | 414/797.9 |
| 5,641,054 | 6/1997 | Mori et al. | 198/465.1 |
| 5,669,156 | 9/1997 | Vejchoda | 34/248 |
| 5,863,176 | 1/1999 | Newnes et al. | 414/797.9 |
| 5,971,698 | 10/1999 | Dowling | 414/797.9 |

FOREIGN PATENT DOCUMENTS

| | | | |
|---|---|---|---|
| 1479181 | 5/1989 | U.S.S.R. | 414/797.9 |

*Primary Examiner*—Douglas Hess
*Attorney, Agent, or Firm*—Merchant & Gould P.C.

[57] ABSTRACT

An apparatus for accumulating and separating laminations including a lamination storage area; a magnetic fanner arrangement for accumulating and magnetically separating the laminations; a transport mechanism; and a mechanical agitation mechanism. The transport mechanism transports at least one lamination from the lamination storage area to the magnetic fanner arrangement and the mechanical agitation mechanism is in communication with the magnetic fanner arrangement and provides a physical agitation to the magnetic fanner arrangement. The magnetic fanner arrangement includes a mounting plate; at least a first and second magnetic pole piece assembly fixedly mounted opposite one from the other and substantially perpendicularly to the mounting plate defining a space therebetween, the space being generally U-shaped, in plan view, having a back wall formed by the mounting plate and a pair of side walls formed by the first and second magnetic pole piece assemblies, the space being used for accumulating the laminations; and a magnetic field generated by the first and second magnetic pole piece assembly polarizing the laminations accumulated within the space and causing the laminations to magnetically repel each other and become physically separated.

18 Claims, 4 Drawing Sheets

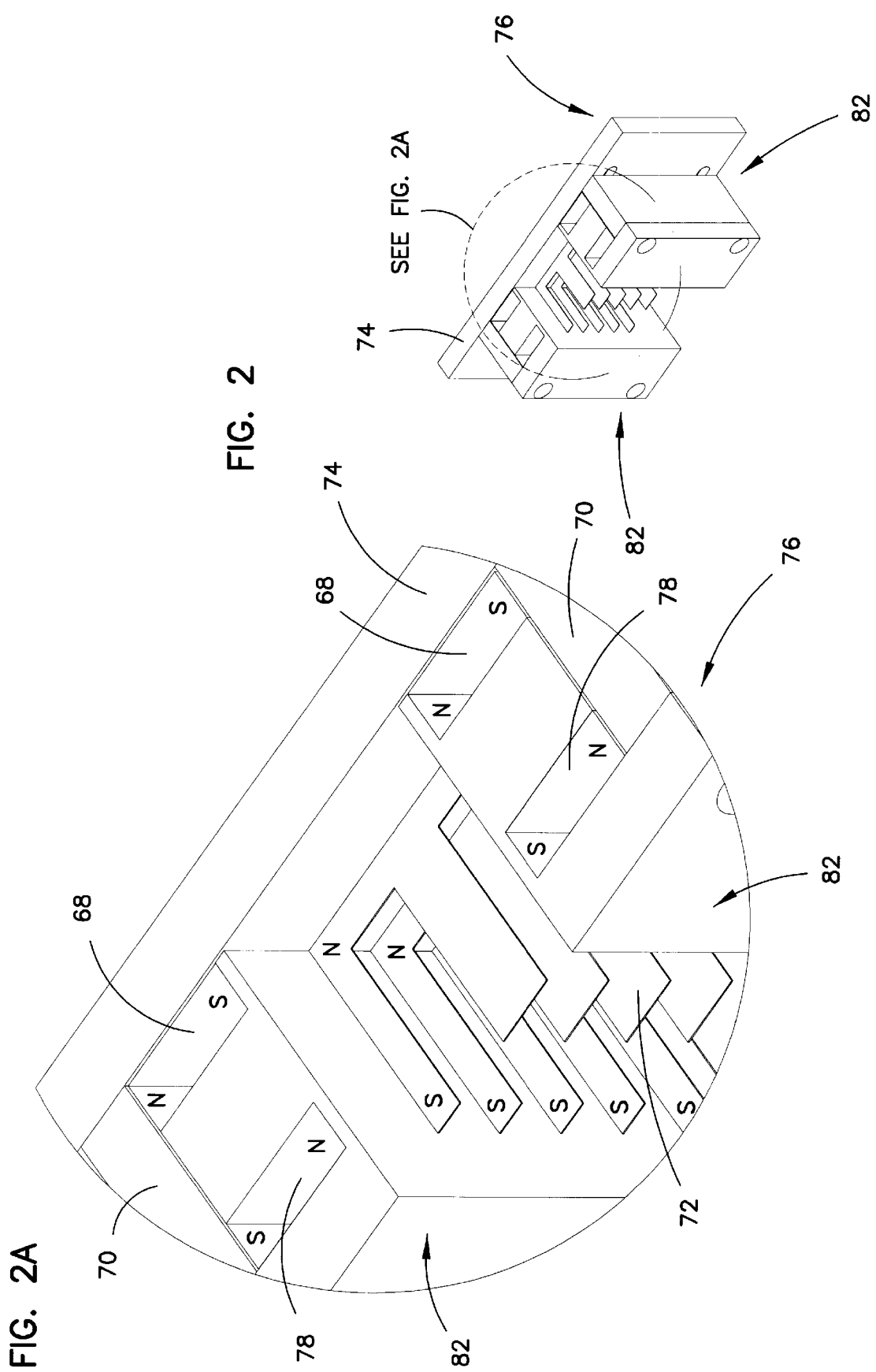

6,146,086

MAGNETIC FANNING ACCUMULATOR

BACKGROUND OF THE INVENTION

1. Field of the Invention

This invention relates to transformer laminations, more particularly to automatic stacking and dispensing of transformer laminations.

2. Description of Related Art

Conventional stacking methods utilize mechanical push plates that physically push transformer laminations from a stack onto a lamination assembly unit.

Several problems exist with the conventional method of stacking and dispensing transformer laminations from a stack to a subsequent assembly operation.

First, whenever the transformer laminations are stacked they tend to stick to one another making it difficult for the mechanical push plate to dispense a single lamination during the assembly operation.

Second, the transformer laminations are sometimes bent and damaged by physical contact with the push plate.

Thus, there is a need for an improved apparatus and method to stack and dispense transformer laminations in an automatic fashion without damaging the transformer laminations while ensuring that only one lamination at a time is dispensed from the stack.

The present invention solves these and other problems associated with the prior art.

SUMMARY OF THE INVENTION

The present invention relates to a method and apparatus of providing a transformer lamination in an automatic assembly process. The present invention also relates to a method and apparatus for reducing damaged product and allowing the dispensing of a single lamination per automatic assembly machine cycle during the automatic assembly process.

In one embodiment, the present invention provides an apparatus for storing, accumulating, separating and dispensing transformer laminations comprising a lamination storage area; a magnetic fanner arrangement for accumulating and magnetically separating the transformer laminations; a mechanism for transporting at least one lamination from a storage area to the magnetic fanner arrangement; and a mechanical agitation mechanism coupled to the magnetic fanner arrangement.

Still in one embodiment, the present invention provides the magnetic fanner arrangement, used for accumulating and magnetically separating the laminations and further comprising a mounting plate; at least a first and second magnetic pole piece assembly fixedly mounted opposite one from the other and substantially perpendicularly to the mounting plate defining a space therebetween, the space being generally U-shaped, in plan view, having a back wall formed by the mounting plate and a pair of side walls formed by the first and second magnetic pole piece assemblies, the space being used for accumulating the laminations; a magnetic field being generated by the first and second magnetic pole piece assemblies polarizing the laminations accumulated within the space and causing the laminations to magnetically repel each other and become physically separated.

Accordingly, in one embodiment, the magnetic fanner arrangement contains the laminations while exposing them to a magnetic field that polarizes the laminations contained within the magnetic fanner arrangement in such a manner that the laminations magnetically repulse each other, thus physically separating each from the other and making it easier to dispense a single lamination during the automatic assembly process.

Still in one embodiment, the transformer laminations are stacked and separated in the magnetic fanner arrangement prior to dispensing a single lamination further in the automatic assembly process, thus adding accuracy and reliability to the transformer lamination dispensing process.

Yet in one embodiment, the magnetic fanner arrangement further comprises at least one pair of magnetic pole piece assemblies that generate the magnetic field utilized in the separation of the transformer laminations. Accordingly, in one embodiment, each magnetic pole piece assembly comprises at least one permanent magnet, and in yet another embodiment, each magnetic pole piece assembly comprises at least one electromagnet.

In a further embodiment, the present invention includes a mechanical agitation mechanism comprised of a striker plate and a mechanism used for oscillating the striker plate. The striker plate being mechanically coupled to the oscillating mechanism and the magnetic fanner arrangement causing the striker plate to oscillate and agitate a magnetic fanner arrangement. Accordingly, further in one embodiment, agitation of the magnetic fanner arrangement by the striker plate combined with the magnetic field generated by the first and second magnetic pole piece assemblies physically separates the transformer laminations contained within the magnetic fanner arrangement.

In one embodiment, the present invention also provides an apparatus for transporting a transformer lamination from the magnetic fanner arrangement to an insertion arrangement comprising a movable plate; an injection mechanism whereby the movable plate is disposed so that it moves between the magnetic fanner arrangement and the injection mechanism; and a first transport mechanism for transporting the movable plate to a position proximate the injection mechanism where the lamination is transferred from the movable plate onto the injection mechanism. In a further embodiment of the present invention, a vacuum pick-up mechanism is utilized to remove a single transformer lamination from the magnetic fanner arrangement and load it onto a movable transfer plate. Further, in one embodiment, the movable transfer plate comprises a vacuum pick-up mechanism. The movable plate delivering the lamination proximate to an air injection mechanism that operates on conventional compressed air readily available from a local air compression means. Still in another embodiment of the present invention, the injection mechanism further comprises a cover that covers the transformer lamination. Accordingly, when the transformer lamination is beneath the cover, vacuum is removed and air pressure is applied to the transformer lamination to propel it onto a transformer bobbin, for example.

Accordingly in an embodiment of the present invention, a single transformer lamination can be readily transported from the magnetic fanner arrangement to the injection mechanism without damaging the transformer lamination and ensuring that only one transformer lamination per automatic assembly machine cycle is transferred to the injection mechanism for subsequent assembly processes.

In one embodiment, the present invention also provides a method of loading a lamination onto an injection mechanism, whereby the method comprises retrieving of at least one lamination from a storage area; transporting the lamination to a magnetic fanner arrangement; separating the laminations; transferring the lamination onto a movable plate; and introducing the lamination to the injection mechanism.

Accordingly in one embodiment, the laminations are not damaged, for example by bending from physical contact with a mechanical pusher plate during the process of dispensing laminations from a stack. Also, the stacked laminations do not stick together because of the combined function of magnetic field and the agitation of the magnetic fanner arrangement in separating the laminations. Thus, ensuring the delivery of a single lamination per automatic assembly machine cycle.

In another embodiment, the present invention is a method that further includes a counting mechanism for counting a quantity of laminations prior to transferring the laminations to the magnetic fanner arrangement. Accordingly, a known, predetermined quantity of laminations is transferred to the magnetic fanner arrangement.

In another embodiment, the present invention is a method of separating laminations further comprising the utilization of a magnetic field combined with an agitating motion produced by an oscillating striker plate.

In yet another embodiment, the present invention is a method of utilizing a vacuum to transfer the lamination onto a movable plate and air pressure to transfer the lamination from the movable plate onto an air injection mechanism.

These are but some of the many embodiments in accordance with the principles of the present invention.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 is a view of a magnetic fanner arrangement.

FIG. 2A is a detail view of a magnetic fanner arrangement showing first and second magnetic pole piece assemblies.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
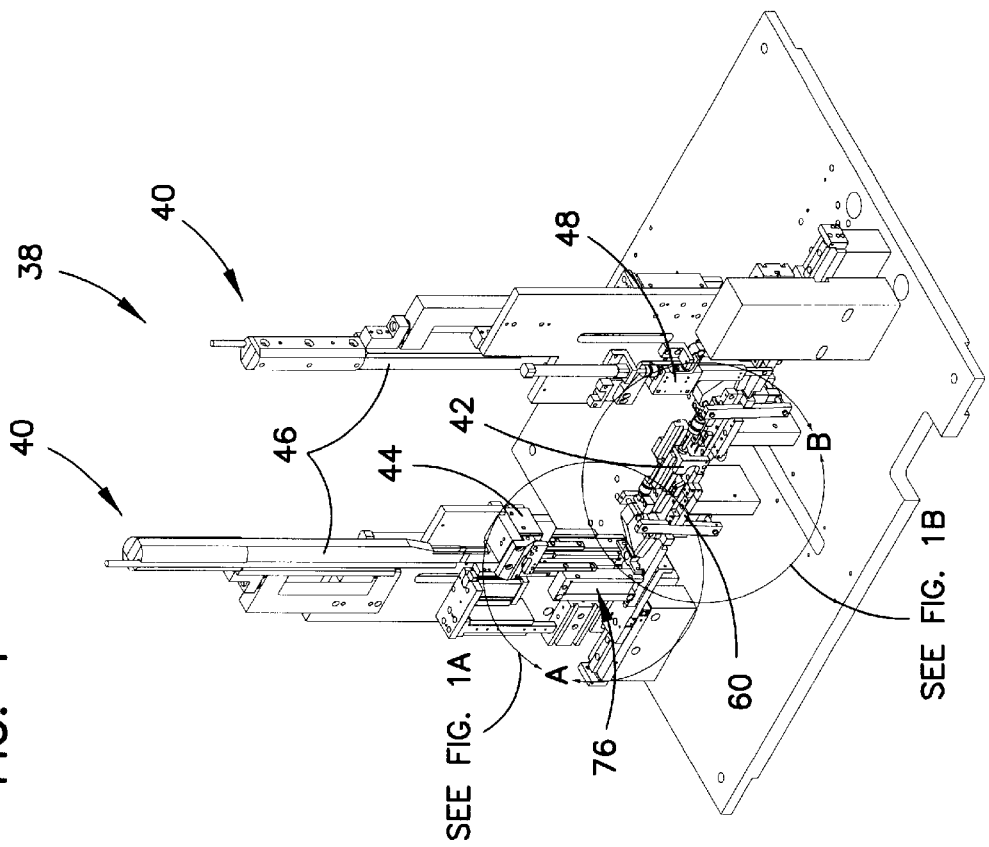
FIG. 1. Illustrates a view of a lamination assembly machine.
Figure 1A:
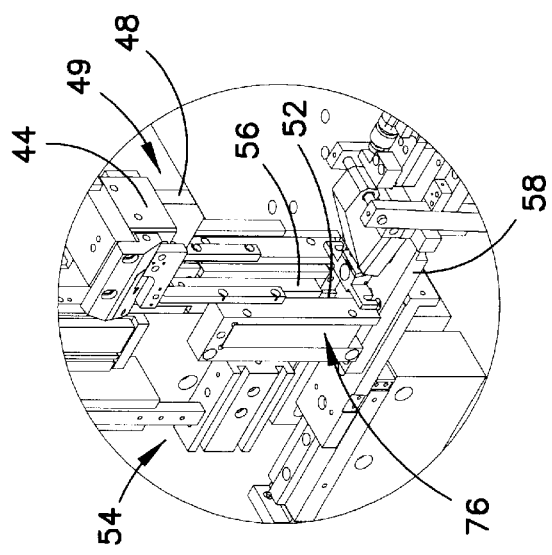
FIG. 1A. Is a detail view of FIG. 1 showing a transport mechanism and a striker plate assembly.
Figure 1B:
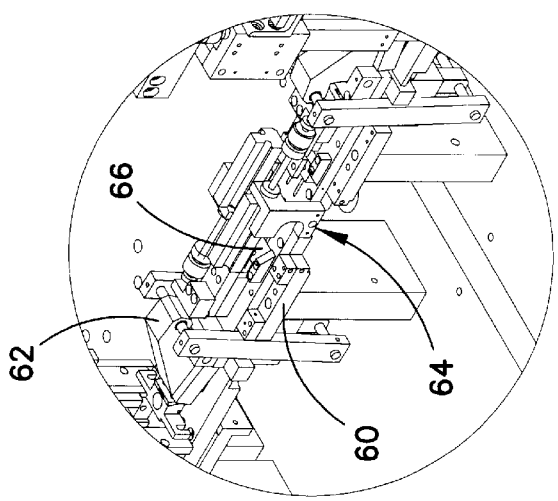
FIG. 1B. Is a detail view of FIG. 1 showing an air injection mechanism.

FIGS. 1, 1A and 1B illustrate a transformer lamination assembly machine 38 to insert and interleave "E" shaped transformer laminations 72 (FIG. 2) into a wound transformer bobbin 42.

FIG. 1 illustrates the entire assembly machine 38 comprised of two substantially identical lamination assembly mechanisms 40 arranged opposite of each other on either side of a transformer bobbin 42.

Figure 3:
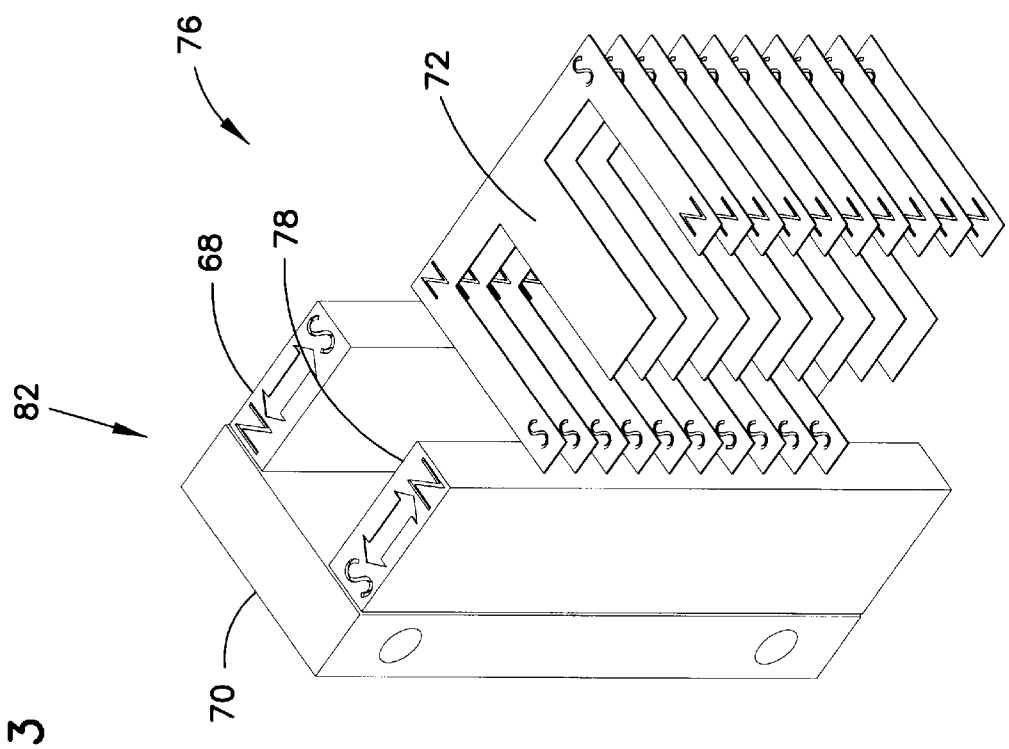
FIG. 3 is a partial detail view of a lamination magnetic fanner arrangement and pole piece assembly.

As shown in FIGS. 1 and 1A each lamination assembly mechanism 40 is comprised of an escapement 44 utilized as a counting mechanism to meter an unspecified quantity of transformer laminations 72 (FIG. 2) from the bottom of a lamination storage area or stack 46. The metered quantity of transformer laminations 72 (FIG. 2) move along a first transport mechanism 49 comprised of an actuated guided plate 48. The magnetic fanner arrangement 76 comprised of a mounting plate 74 (FIG. 2) and first and second magnetic pole piece assemblies 82 (FIG. 2) mounted on either side of a guide channel 52. Each magnetic pole piece assembly 82 (FIG. 2) is comprised of a pole piece 70 (FIG. 2) and two to three magnets 68, 80 (FIG. 3). It will be appreciated that other transport mechanisms may include a variety of pneumatic or motorized actuators combined with a variety of metering features. The transport mechanism 49 supplies the laminations 72 (FIG. 2) to the magnetic fanner arrangement 76 in such a way as to keep the magnets from pulling in too many laminations 72 (FIG. 2).

Positioned to the rear of the magnetic fanner arrangement is a striker plate assembly 54. An oscillating mechanism oscillates the striker plate 54 back and forth It will be appreciated that a variety of pneumatic or motorized actuator or cam systems that provide a physical agitation to the laminations 72 (FIG. 2) in the magnetic fanner may be used as an oscillating mechanism. The striker plate 55 (FIG. 4A) moves back and forth and hits on the back edge of the lamination 72 (FIG. 2). The laminations 72 (FIG. 2) need this snapping motion to separate properly. It is important to note that the laminations 72 (FIG. 2) are agitated within the magnetic fanner. The magnets themselves do not move. The striker plate 55 (FIG. 4A) is not coupled directly to the magnetic fanner. The striker plate 55 (FIG. 4A) is a U-shaped piece that passes through slots cut in the back wall of the magnetic fanner and is attached to and actuated by a guided cylinder. It will be appreciated that during each thrust of the striker plate 55 (FIG. 4A) the magnetic fanner arrangement is agitated. The combined effect of the magnetic field, produced by the magnets within the magnetic fanner arrangement, and the agitation caused by the striker plate assembly 54 separates the laminations 72 (FIG. 2) contained within the magnetic fanner arrangement along the guide channel 52.

A push plate 56 oscillates between the rails of the guide channel 52 and pushes the laminations 72 (FIG. 2) down onto a second transport mechanism, herein referred to as a movable plate 58, that further comprises a vacuum pickup mechanism 59. It will be appreciated that a moveable plate and the vacuum pickup mechanism 59 may be incorporated into a single assembly. Again, it will be appreciated that any pneumatic or motorized actuator or cam system may replace the guided cylinder to perform the back and forth motion. It is also appreciated that this mechanism may be bypassed entirely and insert the lamination 72 (FIG. 2) directly into the air injector. In one embodiment of the present invention it is used as a checkpoint to ensure that only one lamination 72 (FIG. 2) is being inserted. The plate 58 moves the laminations 72 (FIG. 2) along a guide channel guides and is actuated by the guided cylinder to provide horizontal motion. The movable plate 58 comprising a vacuum pickup mechanism 59, shown in the forward position, oscillates back and forth under the rails of the guide channel 52 in cooperation with the oscillation of the push plate 56. Thus, a single lamination 72 (FIG. 2) is introduced to the movable plate 58 is held in position by the vacuum pick-up mechanism moves in a horizontal motion away from the guide channel 52 toward the transformer bobbin 42 and introduces the single lamination 72 (FIG. 2) to the air injection mechanism 60. It is appreciated that insertion of the laminations 72 (FIG. 2) also may be accomplished with an air venturi system which would create a vacuum and draw the laminations 72 (FIG. 2) in or also may be accomplished with simple mechanical push plates to push the laminations 72 (FIG. 2) into the transformer bobbin 42.

As shown in FIG. 1B the air injection mechanism 60 is provided with a cover 62 which closes over the single transformer lamination 72 (FIG. 2) when the vacuum pickup mechanism 59 is in the forward position, close to the guide channel 52. At this point, the vacuum is released and compressed air is introduced into an internal chamber formed by the interior space of the cover 62. The compressed air drives the transformer lamination and inserts it into the transformer bobbin 42 at location 64. Small pins 66 oscillate from each side and secure the laminations 72 (FIG. 2) already in place in the transformer bobbin 42 to prevent their being dislocated by subsequent transformer laminations 72 (FIG. 2) being inserted into the transformer bobbin 42. Further, the small pins 66 ensure that the transformer laminations 72 (FIG. 2) are fully inserted and are tightly packed into the transformer bobbin 42.

FIG. 2 illustrates a detail of the magnetic fanner arrangement 76. It is comprised of a mounting plate 74 and first and second magnetic pole piece assemblies 82 positioned to create a space between the first and second magnetic pole piece assemblies 82 to hold the laminations 72. Each magnetic pole piece assembly 82 is comprised of two permanent magnets 68 and 78. The magnets are arranged in a manner such that the two magnets 68 located adjacent the mounting plate 74, of the magnetic fanner arrangement 76, are aligned in series on opposite ends of the transformer laminations 72. The other two magnets 78, located away from the mounting plate 74 toward the front opening of the magnetic fanner arrangement 76, are also aligned in series but in the opposite direction of magnets 68. The arrangement of the rear magnets 68 generates a magnetic pole in one direction while the arrangement of the front magnets 78 generate a magnetic pole in the opposite direction.

The effect of this is that the ends of adjacently stacked transformer laminations 72 are magnetized in the same direction and thus having the same polarity, repel each other, causing the laminations 72 to physically separate or "fan-out", hence the name magnetic "fanner".

As shown in FIG. 2A each magnetic pole piece assembly 82 also includes a pole piece 70 to complete the magnetic path of the two sets of permanent magnets, 68 and 78, and thus forming a horseshoe or "U" shaped magnet each one located on opposite ends of the transformer laminations 72. In the preferred embodiment the ferrous pole pieces 70 are made of cast iron.

Of course in other embodiments electromagnets in place of permanent magnets 68, 78 and 80 would work as well. It will appreciated that any arrangement that produces two oppositely polarized magnetic faces that are coplanar may be used for the pole pieces.

Figure 3A:
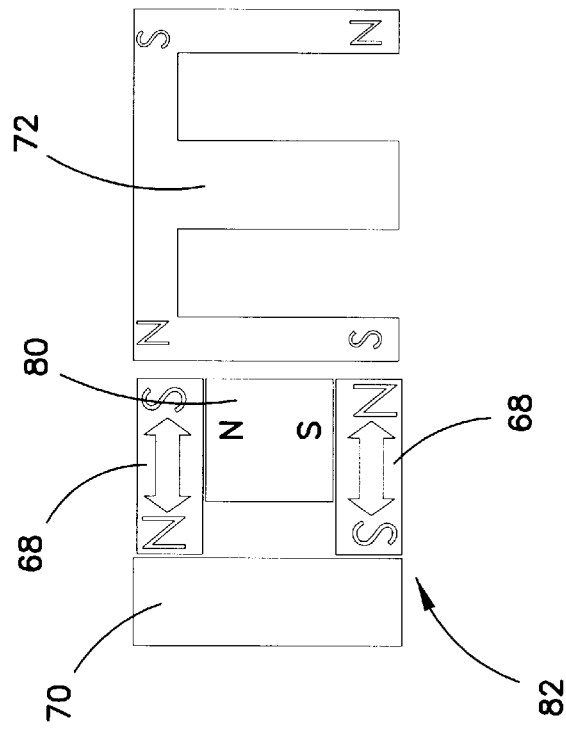
FIG. 3A is a detail view of a magnetic pole piece assembly and lamination showing a third blocker permanent magnet.

FIG. 3 illustrates a further detail of a portion of the magnetic fanner arrangement 76 shown without some of the other components for clarity. Only a portion of one magnetic pole piece assembly 82 is shown. FIG. 3A is a plan view of a portion of the magnetic fanner arrangement 76.

As shown in FIG. 3A, in cases where the spacing between the permanent magnets 68 is one half inch or greater, a third blocker permanent magnet 80 can be added between the permanent magnets 68. The polarity of the blocker permanent magnet 80 is arranged perpendicularly to the existing permanent magnets 68, 78 and is used to decrease the flux between the permanent magnets, thus increasing the separation distance between the transformer laminations 72. This figure shows with clarity the method of polarizing the laminations 72 in the same directions such that they magnetically repel each other.

A blocker permanent magnet 80 would be used in the same manner on the other half of the magnetic fanner arrangement 76 not shown in FIG. 3.

Figure 4:
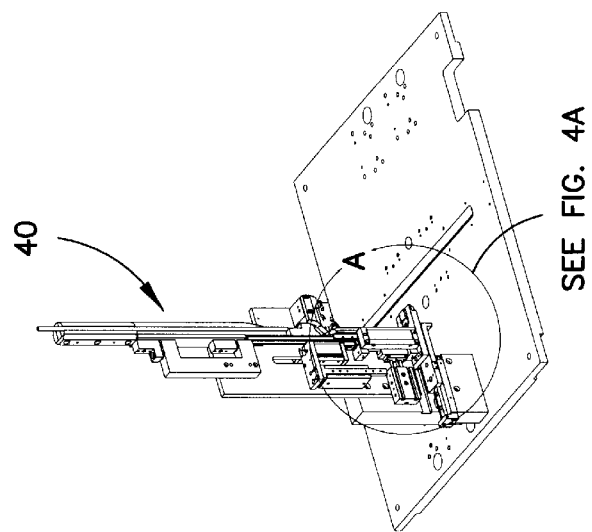
FIG. 4 is a view of one portion of a lamination assembly mechanism.
Figure 4A:
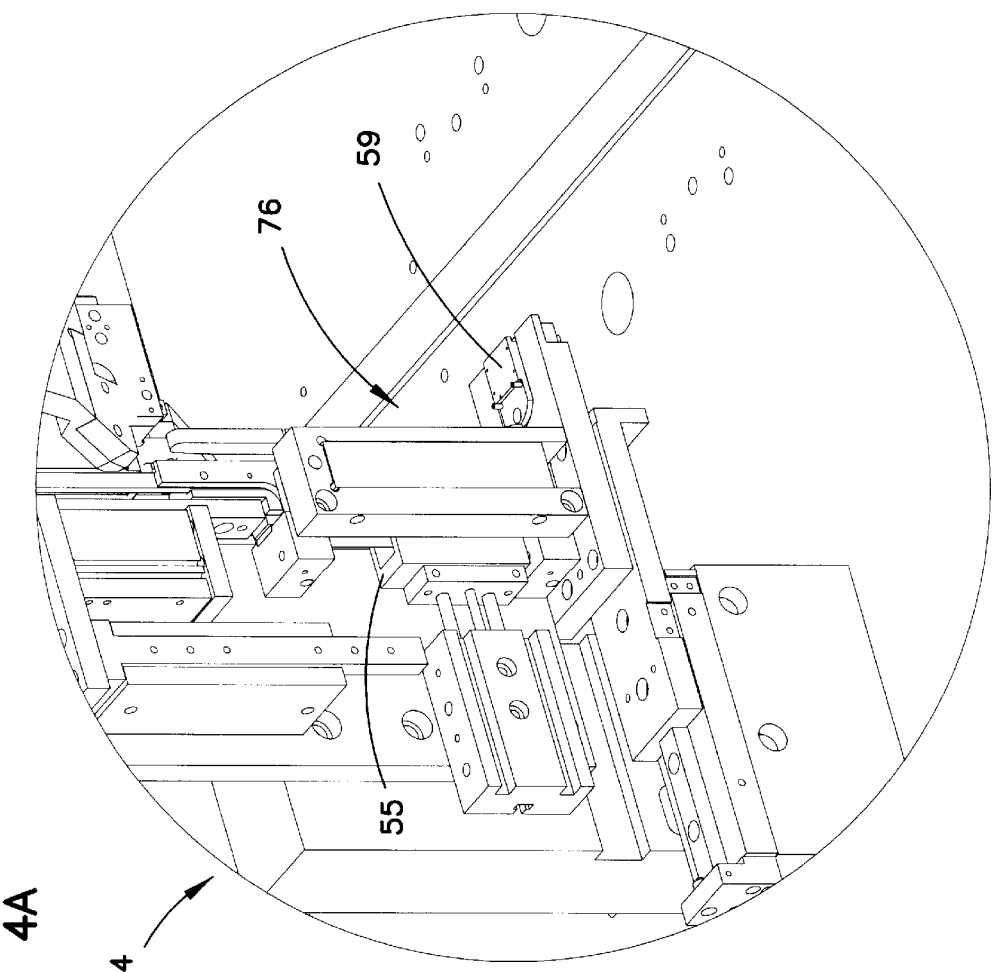
FIG. 4A is a detail view of a striker plate assembly.

FIG. 4 illustrates one portion of a lamination assembly mechanism 40 while FIG. 4A shows a detail view of the striker plate assembly 54 showing the striker plate 55 in relation to the magnetic fanner arrangement 76.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for accumulating and separating laminations comprising:
   a lamination storage area;
   a magnetic fanner arrangement for accumulating and magnetically separating the laminations;
   a transport mechanism;
   the transport mechanism transporting at least one lamination from the lamination storage area to the magnetic fanner arrangement; and
   a mechanical agitation mechanism;
   wherein the mechanical agitation mechanism is in communication with the magnetic fanner arrangement and provides a physical agitation to the magnetic fanner arrangement.

2. The apparatus according to claim 1 wherein the magnetic fanner arrangement for accumulating and magnetically separating the laminations, comprises:
   a mounting plate;
   at least a first and second magnetic pole piece assembly fixedly mounted opposite one from the other and substantially perpendicularly to the mounting plate defining a space therebetween, the space being generally U-shaped, in plan view, having a back wall formed by the mounting plate and a pair of side walls formed by the first and second magnetic pole piece assemblies, the space being used for accumulating the laminations; and
   a magnetic field;
   the magnetic field being generated by the first and second magnetic pole piece assembly polarizing the laminations accumulated within the space and causing the laminations to magnetically repel each other and become physically separated.

3. The magnetic fanner arrangement of claim 2, wherein the first and second magnetic pole piece assemblies includes at least one magnet.

4. The magnetic fanner arrangement of claim 3, wherein the at least one magnet is a permanent magnet.

5. The magnetic fanner arrangement of claim 3, wherein the at least one magnet is an electromagnet.

6. The apparatus according to claim 1 wherein the mechanical agitation mechanism comprises:

a striker plate; and an oscillating mechanism;

wherein the oscillating mechanism is coupled to the striker plate causing the striker plate to oscillate and agitate the magnetic fanner arrangement.

7. The apparatus according to claim 6, wherein the agitation of the striker plate is used in combination with a magnetic field generated by a magnetic field arrangement to separate the laminations accumulated in the magnetic fanner arrangement.

8. An apparatus for transporting a lamination from a magnetic fanner arrangement to an insertion arrangement comprising:

a magnetic fanner arrangement;

a movable plate;

a transport mechanism;

the transport mechanism transferring the lamination from the magnetic fanner arrangement onto the movable plate; and an injection mechanism;

the movable plate disposed to move between the magnetic fanner arrangement and the injection mechanism; and the transport mechanism transporting the movable plate to a position proximate the injection mechanism and the lamination being transferred from the movable plate onto the injection mechanism.

9. The apparatus according to claim 8, wherein the movable plate further comprises a pick-up mechanism.

10. The movable plate according to claim 9, wherein the pick-up mechanism is a vacuum operated pick-up mechanism.

11. The apparatus according to claim 8, wherein the injection mechanism is an air injection mechanism.

12. The apparatus of claim 8, wherein the injection mechanism further comprises a cover for the lamination.

13. A method of loading an injection mechanism with a lamination, the method comprising:

retrieving at least one lamination from a storage area;

transporting the lamination to a magnetic fanner arrangement, the magnetic fanner arrangement containing one or more laminations;

separating the laminations within the magnetic fanner arrangement;

transferring a lamination from the magnetic fanner arrangement onto a movable plate; and introducing the lamination to the injection mechanism.

14. The method of claim 13, further comprising a counting mechanism, the counting mechanism counting a quantity of laminations prior to transferring the laminations to the magnetic fanner arrangement.

15. The method of claim 13, wherein a magnetic field produced by a magnetic pole piece assembly and an agitating motion produced by an oscillating striker plate is utilized in combination in separating the laminations.

16. The method of claim 13, wherein a vacuum operated pick-up mechanism is used in transferring the lamination onto the movable plate.

17. The method of claim 13, wherein pressurized air is used in transferring the lamination from the movable plate an introducing the lamination to the injection mechanism.

18. A magnetic fanner arrangement for accumulating and magnetically separating laminations, comprising:

a mounting plate;

at least a first and second magnetic pole piece assembly fixedly mounted opposite one from the other and substantially perpendicularly to the mounting plate defining a space therebetween, the space being generally U-shaped, in plan view, having a back wall formed by the mounting plate and a pair of side walls formed by the first and second magnetic pole piece assemblies, the space being used for accumulating the laminations; and a magnetic field, the magnetic field being generated by the first and second magnetic pole piece assembly polarizing the laminations accumulated within the space and causing the laminations to magnetically repel each other and become physically separated.

* * * * *